June 12, 1962 D. A. BOSSEN 3,038,401
MEASURING AND CONTROLLING SYSTEM
Filed Nov. 8, 1957
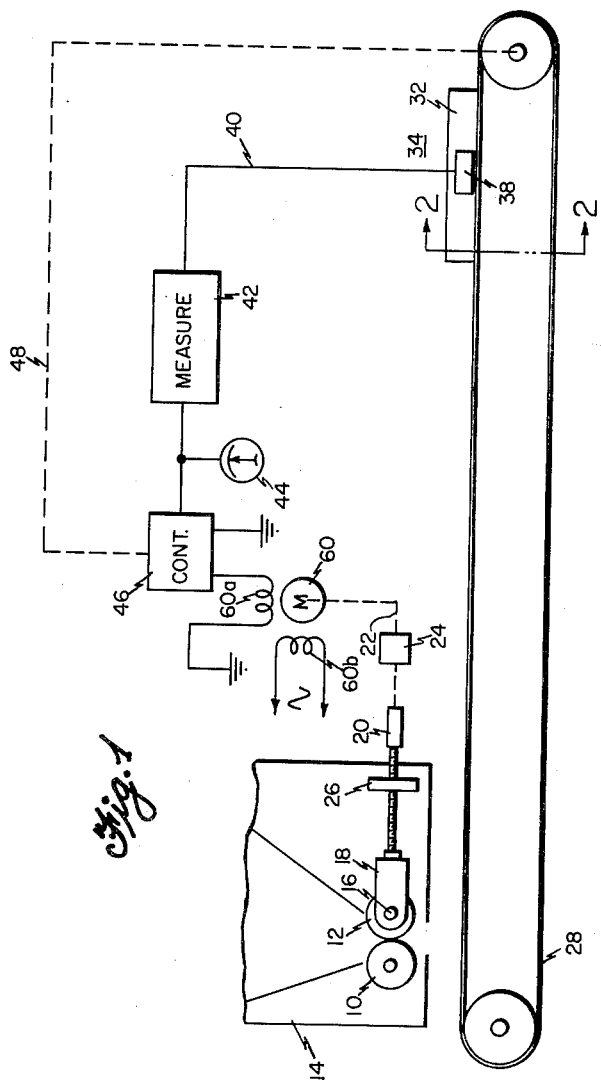
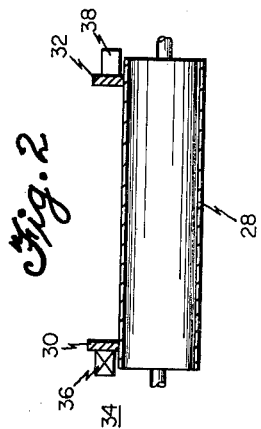
INVENTOR
David A. Bossen
BY Anthony D. Cennamo
ATTORNEY

United States Patent Office 3,038,401
Patented June 12, 1962

3,038,401
MEASURING AND CONTROLLING SYSTEM
David A. Bossen, Columbus, Ohio, assignor to Industrial Nucleonics Corporation, a corporation of Ohio
Filed Nov. 8, 1957, Ser. No. 695,450
7 Claims. (Cl. 99—237)

The present invention relates to apparatus for the manufacture of bulk material and more particularly to an apparatus for manufacturing flake material wherein the bulk density, that is, the weight per unit volume, is maintained at a predetermined substantially constant value.

In the cereal industry, particularly in that segment of the industry relating to the manufacture of corn flakes, oat meal and related cereal products, it is conventional to convert the grains of the cereal into flake form by passing the grains between spaced flaking rolls, the spacing between the flaking rolls determining the thickness and size of the resulting flakes Assuming the density of the material of the individual flakes to be uniform, the size and thickness of the flakes determine the quantity of flakes which may be disposed in a given volume and therefore determines the weight per unit volume of the bulk flake material.

Weight per unit volume of the bulk flake material may be conveniently referred to as "bulk density." It is apparent that the bulk density always has a smaller numerical value than the density of an individual flake, by reason of the fact that air spaces occur between the individual flakes in a quantity thereof. It follows that a decrease in the spacing between the flaking rolls produces a decrease in the bulk density, because the resulting thin-rolled flakes have a greater diameter and a greater tendency to warp and curl both initially and during the drying thereof. Hence a stack or a box of the thin flakes has a greater number of larger interstices between individual flakes, which is to say that fewer flakes and less actual flake material are present in a given size stack or box of flakes.

In the conventional machines for producing flake material, the spacing between the rolls is adjusted manually and it is then generally assumed that the adjustment remains constant and that the bulk density remains at the desired value during subsequent operation of the machine. In fact, however, the bulk density does not remain constant and a considerable variation in this quantity occurs.

Variation in the weight per unit volume of the bulk material is undesirable, since such variation affects the quality of the finished product. More serious, however, is the difficulty in properly packaging the flake material when the bulk density varies. Cereals, particularly flaked breakfast cereals, are normally sold on a weight basis; that is, so many ounces per package. If the bulk density of the material is too high, the package is not filled even though a quantity of material having the proper weight is disposed therein. This results in a package having a proper weight of material, but one which is not filled and therefore one that appears to the consumer to have a slack fill. On the other hand, if the bulk density is too low, it may not be possible to fill the package to the proper weight, even though the package is actually completely full.

In accordance with the present invention, the bulk density variations may be substantially eliminated by passing the grains of cereal to be flaked between coacting flaking rolls, one or both of which is power driven. One flaking roll is mounted for movement transverse to the axis of the other flaking roll so as to provide for variation of spacing between the two rolls. The grains of cereal are passed between the rolls and after being converted to flakes, drop onto a conventional belt conveyor.

A source of radiation such as beta radiation, gamma radiation, or X-ray radiation is mounted at one side of the belt conveyor that carries the flakes away from the rolls. Disposed directly opposite the source of radiation on the other side of the conveyor is a detector such as an ionization chamber or Geiger-Mueller tube. Located between the source and detector are two guide plates which serve to restrict the passage of the cereal flakes between the source and detector, and therefore determine the length of the material through which the radiation beam must pass.

Since the active area of the radiation detector is constant, and, since the width of the conveyor at the detector location is maintained constant by the guide plates, the volume measured by the detector is constant and the signal produced by the detector is indicative of the weight per unit volume of the bulk flake material.

The signal produced by the detector is thereafter compared with a voltage indicative of the desired bulk density of the material. Upon variation of the actual bulk density from the desired figure, an error signal is produced which is a measure of the variation of the actual from the desired bulk density. This error signal is employed to control an electric motor which in turn varies the spacing between the flaking rolls in such a sense as to produce flakes of the desired bulk density.

Although the present invention is described with respect to and has particular application to the production of cereals in flake form, the apparatus may also be employed for controlling the weight per unit volume of other pulverized, powdered or flake bulk material which may or may not be a food product.

It is accordingly a primary object of the present invention to provide an apparatus for the manufacture of bulk material which automatically maintains the bulk weight per unit volume substantially constant.

It is another object of the invention to provide an apparatus of the foregoing type wherein control means are provided to maintain the bulk weight per unit volume of the resulting material at a predetermined desired value.

It is another object of the present invention to provide an apparatus for the manufacture of bulk material for measuring and controlling the bulk weight per unit volume of the material.

It is still another object of the invention to provide a measuring and controlling system for controlling the bulk weight per unit volume of the material that is simple in embodiment and readily adaptable to present day manufacturing processes.

These and further objects and advantages of the invention will become more apparent upon reference to the following specification and claims and appended drawings, wherein:

FIGURE 1 is a schematic diagram of the apparatus of the present invention; and

FIGURE 2 is a diagrammatic section taken along line 2—2 of FIGURE 1.

Referring specifically to FIGURE 1 of the accompanying drawings, grains of a cereal to be converted to flake form are fed between flaking rolls 10 and 12 of a conventional flaking machine 14, diagrammatically illustrated. The flaking rolls 10 and 12 are driven by conventional means (not illustrated). The flaking roll 12 is supported on a shaft 16 journaled in slidable members 18 disposed at opposite sides of the flaking machine, only one of the slides 18 being illustrated in the accompanying drawings. Each of the slidable guides 18 may be provided with a threaded rod 20 having one end rotatably supported in the guide 18 and having the other end coupled via a mechanical link 22 to the shaft of a reversible electric motor 24 conventionally illustrated as a two phase induction motor.

The shaft 20 passes through a threaded aperture in a member 26 secured to the frame of the machine 14, and rotation of the shaft 20 results in movement of the guide 18 horizontally to the right or left, depending upon the direction of rotation of shaft 20. Inasmuch as the roller 12 is carried on the shaft 16 journaled in guide 18, roller 12 moves with guide 18 to increase or decrease the spacing between the flaking rolls 10 and 12.

Upon passing through the flaking rolls 10 and 12, the flake material falls upon the upper surface of a conveyor belt 28 and is transported from the left to right in FIGURE 1. The conveyor belt is provided with guides 30 and 32 (see FIGURE 2) which are employed to guide the flaked material through the measuring area.

Disposed at a predetermined distance from the flaking a suitable radiation detector 38 such as a conventional Geiger-Mueller tube or ionization chamber is connected to a conventional measuring circuitry shown generally at 42. The output potential of the measuring circuitry is metered by a measuring device 44 and is fed to a controlling device depicited generally by the reference numeral 46. The controller 46 comprises a time lag compensating device, a chopping circuit and operational amplifier (all not shown). These are conventional components of servo systems well known to those skilled in the art so a further explanation concerning the interconnection of these parts is deemed unnecessary. The controller 46, synchronized with the speed of the conveyor belt 28 through a mechanical coupling 48, also furnishes a varying voltage to one winding 60a of a two phase motor 60. The other phase winding 60b is connected to a convenient source of A.C. power. The motor 60 by means of a mechanical coupling 22 actuates an adjustment of roll 12 through a gear-reduction box shown generally at 24 by rotating a threaded rod 20 in either a clockwise or a counter-clockwise direction.

A voltage proportional to the bulk density of the flake material is developed by the detector 38 when radiation passes through the flake material and impinges on the detector. This voltage is fed to the measuring circuitry 42 that in a typical embodiment may comprise an electrometer amplifier, a slidewire null balance bridge network and a repeat slidewire bridge mechanically coupled to the first slidewire wherein there is developed a D.C. error voltage. This error voltage is of a magnitude and polarity dependent on the amount and direction in which the signal from detector 38 deviates from a manually adjustable voltage across the repeat slidewire rebalancing bridge network. The setting of this latter voltage corresponds to the desired bulk density of the flake material passing between the source 36 and detector 38. The error voltage which is applied to the controller 46 and read out on the metering device 44, then represents the deviation of the bulk density from the desired quantity. A complete explanation of the measuring circuitry 42 is herein omitted, since a more detailed explanation of this circuit may be proceeded by referring to U.S. Patent 2,790,945, issued April 30, 1957, to H. R. Chope.

The controller 46 will produce an A.C. signal having a phase and magnitude which is a function of the polarity and magnitude of the error signal from the measuring circuitry 42. This A.C. signal is of sufficient power to operate the motor 60 by energizing winding 60a. However, the time lag compensating device incorporated in controller 60 and regulated by the speed of the conveyor belt 28, permits the A.C. signal to be applied to the motor 60 only after specific intervals determined by the length of time required for the flake material to travel from the flaking rolls 10 and 12 to the sensing mechanism 34. No control of motor 60 and consequently of the roll 12 is effected during this period. Any of the systems of compensating for system lag well known to those skilled in the art may be used in controller 46.

Assuming the bulk density is above the desired amount an A.C. signal of a certain phase will be applied to winding 60a which causes motor 60 to turn in a direction which causes the threaded rod 20 to push flaking roll 12 closer to flaking roll 10. After this corrective adjustment is made the power to winding 60a is removed by the time lag compensator. When the density of this corrected adjustment reaches the sensing unit 34 the time lag compensator will again supply the proper magnitude and phase A.C. voltage to winding 60a if the density of the flake material still deviates from the desired quantity.

The measurement of the bulk weight per unit volume effected by the source 36 and detector 38 must be made in such a manner that no independently variable parameters materially affect the measurement. It has been found unsatisfactory to measure the material vertically through the conveyor belt, since the density and thickness of the conveyor belt generally varies appreciably. It has been found, however, that measurements across the belt are quite satisfactory if the width of the bulk material is maintained constant and if the depth of the material is always adequate to fill the space between source and detector. Guides 30 and 32 provide the necessary constant width which is selected to secure an adequate height for the desired process rate.

The embodiment of FIG. 1 illustrates a belt conveyor means, however, it is readily understood that other conveyor means such as a pipe for choke feed may be substituted therefor. Other variations may also be made without departing from the spirit and scope of the invention.

What is claimed is:

1. An apparatus for producing flake material comprising a flaking mechanism including a pair of coacting flaking rolls, the separation of said flaking rolls determining the bulk weight per unit volume of the flake material, means for passing the material between said flaking rolls, a conveyor for receiving the flow of said flake material from said rolls, a radiation source positioned on one side of said conveyor for directing a beam of penetrative radiation through said flow carried by said conveyor, non-compacting means for maintaining a constant volume of said flake material in the path of said beam, radiation detector means positioned on the opposite side of said conveyor and receiving said radiation beam for generating a signal indicative of the bulk weight per unit volume of the flake material on said conveyor, and controller means responsive to said signal for controlling the spacing between said flaking rolls to maintain the bulk weight per unit volume of the flake material substantially constant.

2. An apparatus for producing flake material comprising a flaking mechanism for converting granular material to flake material, said flaking mechanism including a pair of coacting flaking rolls, the spacing of said rolls determining the bulk weight per unit volume of the flake material, means for passing said flake material between said rolls, a conveyor for receiving the flake material from said rolls, said conveyor including guide rails for maintaining constant the width of the body of flake material at at least one position on said conveyor, a radiation source and detector means for generating a signal indicative of the bulk weight per unit volume of the flake material, said radiation source being disposed adjacent one of said guide rails and said detector means being disposed adjacent the other of said guide rails, and controller means responsive to said signal for controlling the spacing between said flaking rolls to maintain the bulk weight per unit volume of the flake material substantially constant.

3. An apparatus for controlling the bulk weight per unit volume of a quantity of material composed of a plurality of discrete members of the material, comprising means for subdividing the material into discrete members, a radiation source and detector means for generating a signal indicative of the bulk weight per unit volume of a predetermined volume of discrete members of the material, means for presenting the predetermined volumes of the material to said detector means, and controller means responsive to said signal for controlling said means for subdividing to maintain the bulk weight per unit volume of the material substantially constant.

4. An apparatus in accordance with claim 3 wherein the discrete material comprises flakes of cereal and wherein said means for subdividing comprises a pair of coacting flaking rolls.

5. An apparatus in accordance with claim 4 wherein said means for presenting includes a conveyor belt having guide members of a predetermined height and lateral spacing disposed along opposite sides of and parallel to the direction of movement of said conveyor belt.

6. An apparatus in accordance with claim 5 wherein said source and said detector means are disposed on opposite sides of said conveyor belt, outwardly of said guide rails and along a path perpendicular to the path of travel of said conveyor belt.

7. An apparatus for producing flakes comprising a flaking mechanism including a pair of coacting flaking rolls, the separation of said flaking rolls determining the weight per unit volume of the flakes, means for passing flake material between said flaking rolls, a choke feed for receiving the flakes from said rolls, a radiation source positioned on one side of said feed and detector means oppositely positioned to said detector for generating a signal indicative of the bulk weight per unit volume of the flakes on said feed, and means for indicating said signal.

References Cited in the file of this patent

UNITED STATES PATENTS

| | | |
|---|---|---|
| 347,790 | Gent | Aug. 24, 1886 |
| 427,159 | Currie | May 6, 1890 |
| 2,667,172 | Broekhuysen | Jan. 26, 1954 |
| 2,704,079 | Molins et al. | Mar. 15, 1955 |
| 2,750,986 | Russell et al. | June 19, 1956 |
| 2,763,790 | Ohmart | Sept. 18, 1956 |
| 2,790,945 | Chope | Apr. 30, 1957 |
| 2,863,812 | Graham | Dec. 9, 1958 |

FOREIGN PATENTS

| | | |
|---|---|---|
| 738,329 | Great Britain | Oct. 12, 1955 |